US010378401B2

(12) United States Patent
Gannefors et al.

(10) Patent No.: US 10,378,401 B2
(45) Date of Patent: Aug. 13, 2019

(54) INLINE SCRUBBER WITH DUAL WATER SYSTEM

(71) Applicant: WÄRTSILÄ MOSS AS, Moss (NO)

(72) Inventors: Jan Gunnar Gannefors, Moss (NO); Per Clausen, Gressvik (NO)

(73) Assignee: WÄRTSILÄ MOSS AS, Moss (NO)

( * ) Notice: Subject to any disclaimer, the term of this patent is extended or adjusted under 35 U.S.C. 154(b) by 0 days.

(21) Appl. No.: 15/568,165

(22) PCT Filed: Apr. 21, 2016

(86) PCT No.: PCT/NO2016/050074
§ 371 (c)(1),
(2) Date: Oct. 20, 2017

(87) PCT Pub. No.: WO2016/171568
PCT Pub. Date: Oct. 27, 2016

(65) Prior Publication Data

US 2018/0149054 A1 May 31, 2018

(30) Foreign Application Priority Data

Apr. 22, 2015 (EP) .................................... 15164659

(51) Int. Cl.
*B01D 45/00* (2006.01)
*B01D 53/14* (2006.01)
(Continued)

(52) U.S. Cl.
CPC ............... *F01N 3/04* (2013.01); *B01D 47/06* (2013.01); *F01N 13/0093* (2014.06);
(Continued)

(58) Field of Classification Search
None
See application file for complete search history.

(56) References Cited

U.S. PATENT DOCUMENTS 3,563,695 A * 2/1971 Benson .............. B01D 53/1406
423/223
3,708,958 A * 1/1973 Duty .................. B01D 53/1493
261/111

(Continued)

FOREIGN PATENT DOCUMENTS

EP 1 857 169 A1 11/2007
EP 2 703 063 A1 3/2014

(Continued)

OTHER PUBLICATIONS

International Preliminary Report on Patentability, issued in PCT/NO2016/050074, dated Jun. 22, 2017.

(Continued)

*Primary Examiner* — Amber R Orlando
*Assistant Examiner* — Phillip Y Shao
(74) *Attorney, Agent, or Firm* — Birch, Stewart, Kolasch & Birch, LLP

(57) ABSTRACT

A method for dual water scrubbing and an in-line dual water scrubber for gas cleaning onboard a vessel are disclosed. The in-line dual water scrubber includes a vertical extended body, a gas inlet, and a gas outlet. The gas inlet is underlying in the lower section of the extended body and the gas outlet is overlying in the upper section of the extended body. A first underlying scrubbing section, and a second scrubbing section in an upper section of the extended body are provided. One or more liquid collectors are arranged above one or more first scrubbing liquid sprayers. The liquid collector is arranged for collecting one or more second scrubbing liquid and for flow through of a vertical upwards flowing gas-flow from the inlet to the outlet.

12 Claims, 4 Drawing Sheets

(51) Int. Cl.
*F01N 3/04* (2006.01)
*B01D 47/06* (2006.01)
*F01N 13/00* (2010.01)

(52) U.S. Cl.
CPC ...... *F01N 13/0097* (2014.06); *B01D 2221/08* (2013.01); *B01D 2247/04* (2013.01); *F01N 2490/08* (2013.01); *F01N 2590/02* (2013.01); *Y02T 10/20* (2013.01)

(56) References Cited

U.S. PATENT DOCUMENTS 3,847,570 A * 11/1974 Gunther ............. B01D 53/1406 95/163
6,881,389 B2 * 4/2005 Paulsen ............. B01D 53/1462 423/210
7,976,809 B2 7/2011 Anttila et al.
2005/0022667 A1 2/2005 Schwab
2010/0206171 A1 8/2010 Peng
2011/0008229 A1 * 1/2011 Iyengar ............. B01D 53/1406 423/229
2011/0308389 A1 * 12/2011 Graff .................. B01D 53/1406 95/166
2012/0312166 A1 12/2012 Theis et al.
2013/0087742 A1 * 4/2013 Blanchard .............. B01D 47/14 252/373
2013/0149204 A1 * 6/2013 Mori .................. B01D 53/1406 422/169

FOREIGN PATENT DOCUMENTS

WO WO 99/44722 A1 9/1999
WO WO 2011/085908 A1 7/2011
WO WO 2012/113977 A1 8/2012
WO WO 2012/153705 A1 11/2012
WO WO 2015/030352 A1 3/2015

OTHER PUBLICATIONS

International Search Report, issued in PCT/NO2016/050074, dated Jul. 7, 2016.
Written Opinion of the International Preliminary Examining Authority, issued in PCT/NO2016/050074, dated Mar. 9, 2017.
Written Opinion of the International Searching Authority, issued in PCT/NO2016/050074, dated Jul. 7, 2016.

* cited by examiner

INLINE SCRUBBER WITH DUAL WATER SYSTEM

FIELD OF THE INVENTION

The present invention relates to the technical field of wet scrubbing of exhaust gas. The invention relates to an apparatus, a scrubber, and a method for removing impurities, such as sulphur from a gas flow, preferably flue gas from a diesel or oil driven motor in a marine vessel, utilizing a dual water scrubbing system.

BACKGROUND ART

Flue gas from combustion sources, for instance motors, often contains pollutive matter. Such contaminants may be removed in a cleaning process. Such a cleaning process may be a scrubber. Scrubbers for cleaning flue gases may broadly be divided into two types, so called wet scrubber and dry scrubber. The main purpose for the scrubber is to remove or neutralize sulphur components from the flue gas, especially sulphur oxide. In addition one may often see that, for a wet scrubber, this will remove particulate matter as well, such as heavy metal, PAH (poly aromatic hydrocarbons), soot and sulphur bonded particles which may be pollutive as atmospheric emission. For marine use usually fuel oil, semi refined heavy oil, is used as fuel. Such oil may have a sulphur content of 4-5%. The limit for allowed sulphur in the exhaust is constantly being lowered. From 2015 within certain sea areas the exhaust should not contain more than maximum about 22 ppm sulphur or a level corresponding to a level equivalent to the use of fuel containing 0.1% sulphur.

A wet scrubber uses a liquid, a so called scrubber liquid, which is sprayed into the gas flow, preferable sprayed out as a mist, in a way that the gas will pass a thin layer of such a scrubber liquid. Depending of use, a scrubber liquid may be fresh water, sea water, slurry, or for instance gray water onboard ships. Scrubbers used for cleaning exhaust gases from larger combustion engines onboard ships often uses seawater or fresh water as a scrubber liquid.

To remove sulphur from the gas the main principle consists in letting the gas react with water to form sulphuric acid. Sea water has a natural buffering capacity for this amount of sulphuric acid. When fresh water in a closed, re circulating system is used, it is, in lack of natural buffering capacity, added a neutralizing chemical, e.g. sodium hydroxide.

It is important for the purification efficiency that the contact between the scrubber liquid and the gas to be cleaned, are as good as possible. Different designs for scrubbers are therefore available.

U.S. Pat. No. 7,976,809B2 describes a scrubber for reduction of sulphur in the exhaust from a marine engine. The Scrubber utilizes fresh water with an additive, NaOH, as a scrubber liquid. The scrubber is a vertical extending tank with one or two liquid spray arrangements with nozzles arranged above the appurtenant packed bed wherein the liquid meets the gas inside and around the packed bed. The exhaust which is wetted by the scrubber liquid passes a demister before the gas is discharged.

WO9944722 describes a scrubber which combines a venturi scrubber and a vertical extended "packed-bed" scrubber. The venturi part is incorporated in the scrubber tank or is placed outside the tank in a slightly inclined design. Typical to this is that the gas and the liquid in the venturi part is flowing downwards.

US20100206171A1 describes a desulphurization equipment for exhaust gas from a marine engine with the use of seawater as scrubber liquid. Also in this scrubber of the packed bed type where the scrubber liquid is added above a so called packed bed and the gas is guided counter current relative to the water flow through the packed bed scrubbing step. The scrubber liquid is removed in the bottom of the scrubber. The lower part is used as a cooling step as well. After the scrubber the used scrubbing liquid is directed for the particles to a purifying step and a neutralization step for the formed acid. The gas inlet is in the bottom step either laterally horizontal or vertically through a feeding pipe with a hat to prevent the downwards flowing liquid to flow into the gas inlet pipe.

WO2012113977A1 relates to a scrubber system for treating exhaust gas in a marine vessel with a water based solution. The scrubber system comprising a first scrubber unit and a second scrubber unit. The exhaust gas inlet located in the first scrubber unit and with the exhaust gas outlet in the second scrubber unit and a second conduit section connecting the first scrubber unit to the second scrubber unit. Each scrubbing unit having separate scrubbing medium circuits. The first scrubber medium circuit is provided with a source of scrubbing solution comprising a first connection to outside of the hull beneath the water line of the vessel and that the second scrubber medium circuit is provided with a source of scrubbing solution comprising a source of fresh water in the vessel.

The above mentioned scrubber designs will have different cleaning efficiencies depending of the velocity and the pressure of the gas and the pressure drop through the scrubber. Externally arranged fans or pumps may be used to force the exhaust through the scrubber. There is often a need for large volumes of water and several steps of wetting the gas. Such designs often becomes space demanding.

The need of less space demanding scrubbers with good efficiency is all over growing. The requirement for purification of the discharged exhaust is continuously tightened up. Onshore the space is necessarily not as important but if the scrubber will be used for instance onboard a ship the available space for the scrubber and the scrubbing arrangement will be limited. Especially the available space will be limited if a scrubber is to be mounted to satisfy the severe limits for pollution from the exhaust gas onboard an existing ship. Onboard a passenger ship the space will already be utilized to the maximum and available space for later installation will be limited and costly. Another aspect to wish for a small and compact installation may be regarding to stability; that one do not wish to place large heavy pipe arrangement high up in the ship.

A limitation for size reduction is that when the scrubber size is reduced, the flue gas speed will rise and the pressure drop over a standard packed scrubber will reach a maximum limit.

SHORT SUMMARY OF THE INVENTION

The present invention solves the problems discussed above and a main object of the present invention is to disclose an inline dual water scrubbing system.

The present invention is an in-line dual water scrubber for gas cleaning onboard a vessel and comprising a vertical extended body, a gas inlet, a gas outlet, the gas inlet is underlying in the lower section of the extended body and the gas outlet is overlying in the upper section of the extended body, a first underlying scrubbing section comprising one or more first circuit liquid inlets,
one or more first scrubbing liquid spray means
one or more first circuit liquid outlets, for a first scrubbing liquid,
a second scrubbing section in upper section of the extended body, comprising
one or more second circuit liquid inlets,
one or more second scrubbing liquid spray means
one or more second circuit liquid outlets, for a second scrubbing liquid, one or more liquid collectors arranged above the one or more first scrubbing liquid spray means, the liquid collector arranged for collecting one or more the second scrubbing liquid and for flow through of a vertical upwards flowing gas-flow from the inlet to the outlet. The liquid collector is arranged to prevent the second scrubbing liquid mixing up with the first scrubbing liquid and allows the scrubber, upon desire, to be operated with two separate liquids and liquid types that might have different properties and should not be treated the same way outside the scrubber.

An advantage of the invention is that the wet scrubber according to the invention will treat exhaust gas in a marine vessel minimizing the problems of prior art. The scrubber is an efficient two or more-stage scrubbing system and is arranged to utilize the benefits of more scrubbing liquid types in one scrubber body, is less space demanding and may have a variety of alternatives for use depending on the surrounding environment. The basic idea of the invention is the inline system with two or more separate scrubbing liquid systems, i.e. in one and the same unit.

The invention is also an inline scrubbing method for cleaning a flue gas onboard a vessel comprising the steps of letting the flue gas flow through an inlet, upwards through a vertical extended body and out through an outlet a first scrubbing liquid is lead through one or more first circuit liquid inlets and into the gas through one or more first scrubbing liquid spray means in a first scrubbing section in a lower section of the extended body, letting the gas, after being scrubbed by the first scrubbing liquid, flow through one or more liquid collectors arranged in the cross section of the extended body, then a second scrubbing liquid is lead through one or more second circuit liquid inlets and into the gas through one or more second scrubbing liquid spray means in a second scrubbing section in upper section of the extended body, collecting the second scrubbing liquid, after being in contact with the gas in the one or more liquid collectors and lead into the second circuit liquid outlets in the lower part of the second scrubbing section of the extended body, preventing the second scrubbing liquid mixing into the first scrubbing liquid, letting the gas further flow upwards towards the outlet.

FIGURE CAPTIONS

The attached figures illustrate some embodiments of the claimed invention.

FIG. 1 shows a partly sketch and sectional view of a scrubber in an embodiment according to the invention with a gas inlet (2) in the bottom with a water trap (6), first and second scrubbing sections (4, 5) with appurtenant liquid inlets (4*i*, 5*i*) and liquid outlets (4*o*, 5*o*), nozzle arrangements/liquid spray means (4*s*, 5*s*) and liquid collectors (70), a droplet separator and a gas outlet (3).

Figure 3:
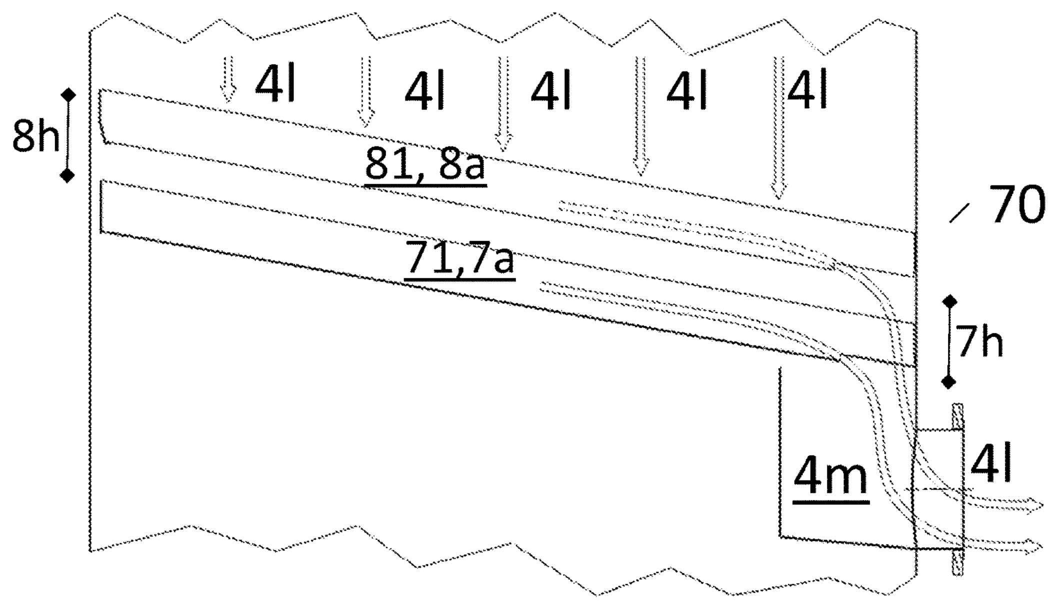
FIG. 3 is a partly sectional and partly cross section view of the liquid collector (70) according to an embodiment of the invention, along the collector mean) where the liquid collector means are ducts (71, 81, . . . ) extending aslant and across the cross section of the scrubber body (10) towards the liquid outlet (4*o*). The arrows indicates the flow path for the collected liquid.
Figure 4:
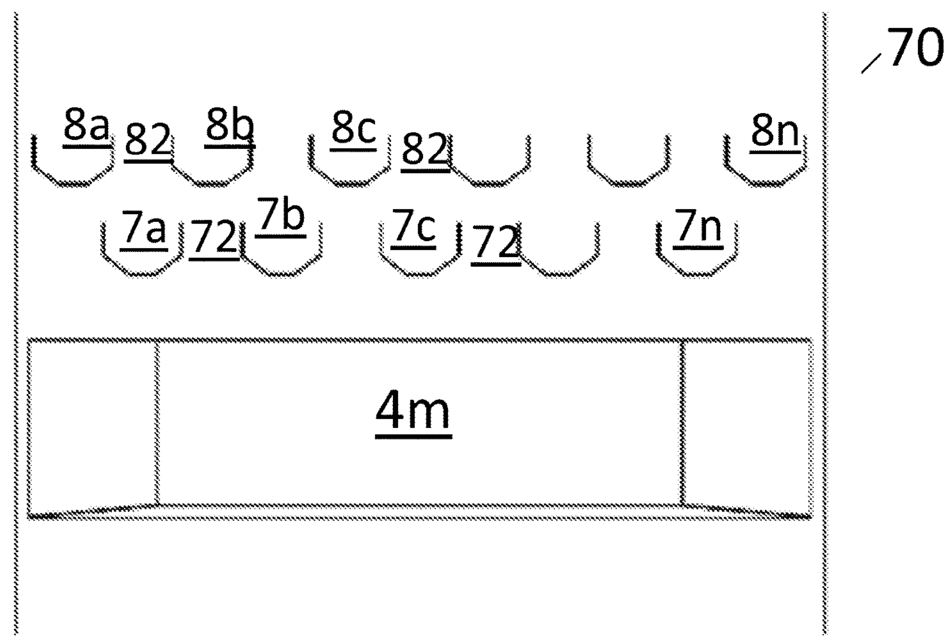

FIG. 4 is a partly sectional and partly cross section view of the liquid collector (70) according to the same embodiment as FIG. 3 of the invention, cross the ducts and the liquid manifold (4*m*). The figure shows how the collecting means of one level is overlaying the gas passages of the below layer. This prevents the liquid to flow across the liquid collector but the gas to flow upwards through the collector (70).

Figure 5:
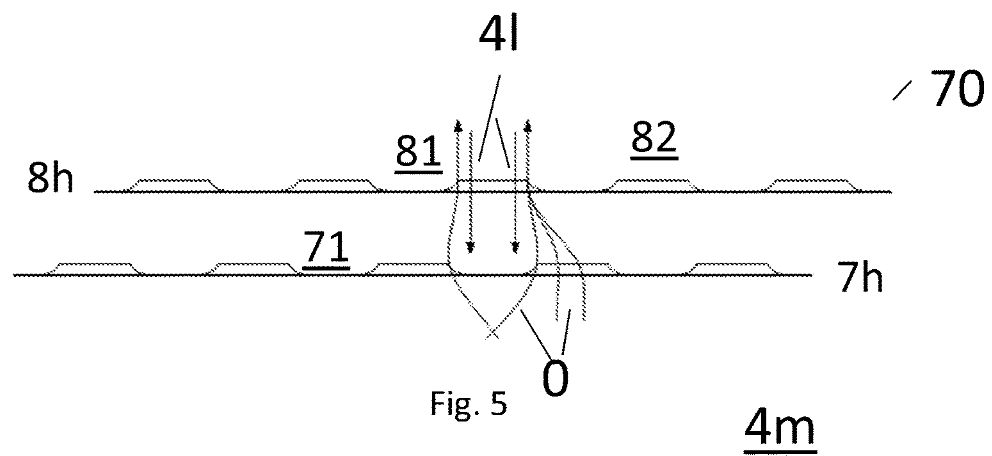

FIG. 5 is cross section view of another embodiment than in FIG. 3 and FIG. 4 of the liquid collector according to the invention. The collector means are sieve plates with the holes surrounded by a collar like frame preventing the liquid flow into the holes when flowing between the holes.

Figure 6:
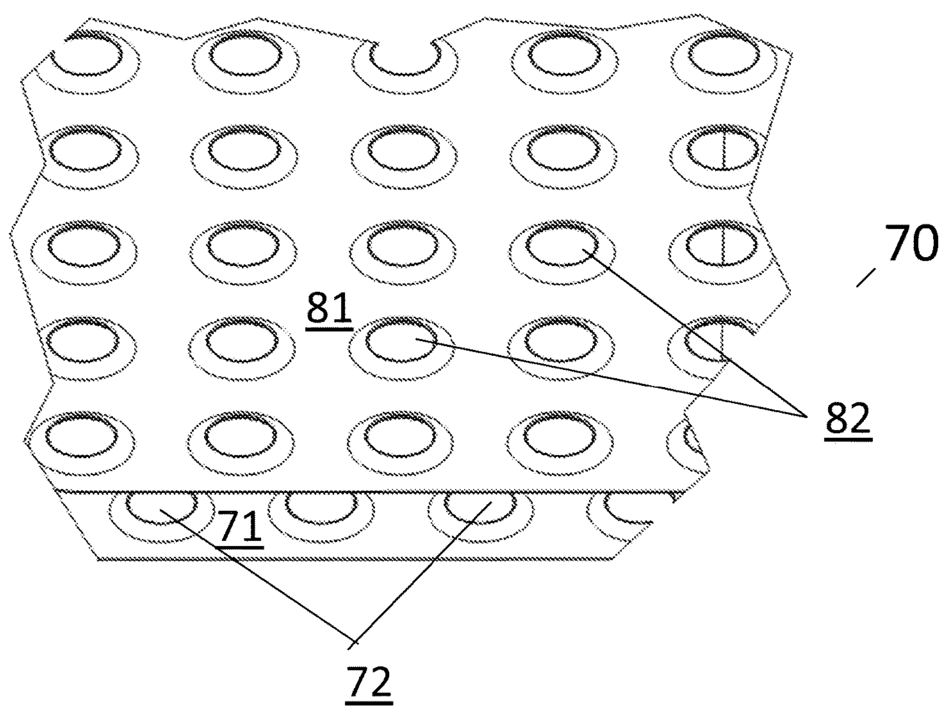

FIG. 6 is a part of a section cut seen from the liquid outlet (4*o*) side of the same embodiment as in FIG. 5.

EMBODIMENTS OF THE INVENTION

The present invention relates to an in-line dual water scrubber for gas cleaning, a scrubbing system and a method for exhaust gas cleaning onboard a vessel.

The invention will in the following be described and embodiments of the invention will be explained with reference to the accompanying figures. The present invention is an in-line dual water scrubber (1) for gas cleaning onboard a vessel and comprising a vertical extended body (10), a gas inlet (2), a gas outlet (3), the gas inlet (2) is underlying in the lower section of the extended body (10) and the gas outlet (3) is overlying in the upper section of the extended body (10), a first underlying scrubbing section (5) comprising
one or more first circuit liquid inlets (5*i*),
one or more first scrubbing liquid spray means (5*s*)
one or more first circuit liquid outlets (5*o*), for a first scrubbing liquid (5*l*),
a second scrubbing section (4) in upper section of the extended body (10), comprising
one or more second circuit liquid inlets (4*i*),
one or more second scrubbing liquid spray means (4*s*)
one or more second circuit liquid outlets (4*o*), for a second scrubbing liquid (4*l*), one or more liquid collectors (70) arranged above the one or more first scrubbing liquid spray means (5*s*), the liquid collector (70) arranged for collecting one or more the second scrubbing liquid (4*l*) and for flow through of a vertical upwards flowing gas-flow (G) from the inlet (2) to the outlet (3). The liquid collector is arranged to prevent the second scrubbing liquid mixing up with the first scrubbing liquid and allows the scrubber, upon desire, to be operated with two separate liquids and liquid types that might have different properties and should not be treated the same way outside the scrubber.

An advantage of the invention is that the wet scrubber according to the invention will treat exhaust gas in a marine vessel minimizing the problems of prior art. The scrubber is an efficient two or more-stage scrubbing system and is arranged to utilize the benefits of more scrubbing liquid types in one scrubber body, is less space demanding and may have a variety of alternatives for use depending on the surrounding environment.

The basic idea of the invention is the inline system with two or more separate scrubbing liquid systems, i.e in one and the same unit.

The different liquid loops will perform somewhat different purification. In the purification step using sea water, the water will react with the sulphur in the gas. The total sulphur content in the gas will not be removed in this step and the number of steps will be chosen based on the desired sulphur purification efficiency for the scrubber. The chemistry of SO2 removal in the wet scrubber can be described along the following principles:

$$SO_2+H_2O \rightarrow H_2SO_3 \text{ (sulphurous acid)}$$

$$SO_3+H_2O \rightarrow H_2SO_4 \text{ (sulphuric acid)}$$

The sulphurous acid will ionise in water with normal acidity creating bisulphite and sulphite ions:

$$H_2SO_3 \leftrightarrow H^+ + HSO_3^- \leftrightarrow 2H^+ + SO_3^{2-}$$

In seawater, containing oxygen, the sulphite will readily oxidise to sulphate:

$$SO_3^{2-} + \tfrac{1}{2}O_2 \rightarrow SO_4^{2-}$$

Also the sulphuric acid will undergo similar reactions:

$$H_2SO_4 \leftrightarrow H^+ + HSO_4^- \leftrightarrow 2H^+ + SO_4^{2-}$$

The acidity resulting from these reactions in the scrubbing process is mainly neutralized by the natural buffering capacity in the seawater, given sufficient amounts of water. The buffering capacity in seawater is significantly caused by the content of natural bicarbonate ($HCO_3^-$) content.

For the scrubbing step using circulated sea water or sweet water/fresh water the buffering capacity of scrubbing liquid will become more limited and a suitable neutralization chemical is added. To neutralize the acid which is formed during the sulphur—water reaction a suitable amount of neutralization chemical is added. This might for instance be NaOH (Sodium hydroxide), lime water or a similar alkaline additive and similar reaction mechanisms with Na, Ca, and OH ions will occur. When chemicals are added there are a certain possibility of controlling the degree of purification. Adding of chemicals will also demand a closed loop system to reduce discharge to the ambient water. Closed loop will still need some make up water (small part addition of fresh ambient water) and will also bleed out some excess water.

When running the scrubber in a dual water mode one may adjust to the desired purification by the use of chemicals added (11).

The separate water loops may have different properties, e.g. different pH with different neutralizing properties. The first liquid drains/outlets (5) drain out the most heavily polluted liquid; most of the acid, the most particles etc.

The scrubber according to such embodiments are less space demanding and with good wetting and the possibility to vary the number of scrubber stages one may achieve as good cleaning efficiency as equivalent to 0.1% sulphur content in the fuel. Such a scrubber is especially well fitted for flue gas from heavy oil or diesel combustion engines, for instance onboard a ship. The scrubbing liquid may be fresh water, sea water or so called grey water and so on. Preferably the scrubber liquid will be ambient water to the vessel. Chemicals may be added to parts or all of the scrubbing liquid to improve the scrubbing efficiency. Depending of the additives or the absence of such, different handling of used scrubber liquid are required.

An advantage with the scrubber according to the invention is that has a slender, elongated body so it is easy to lowering into space onboard a ship with limited space, for instance for later installation of equipment.

Figure 1:
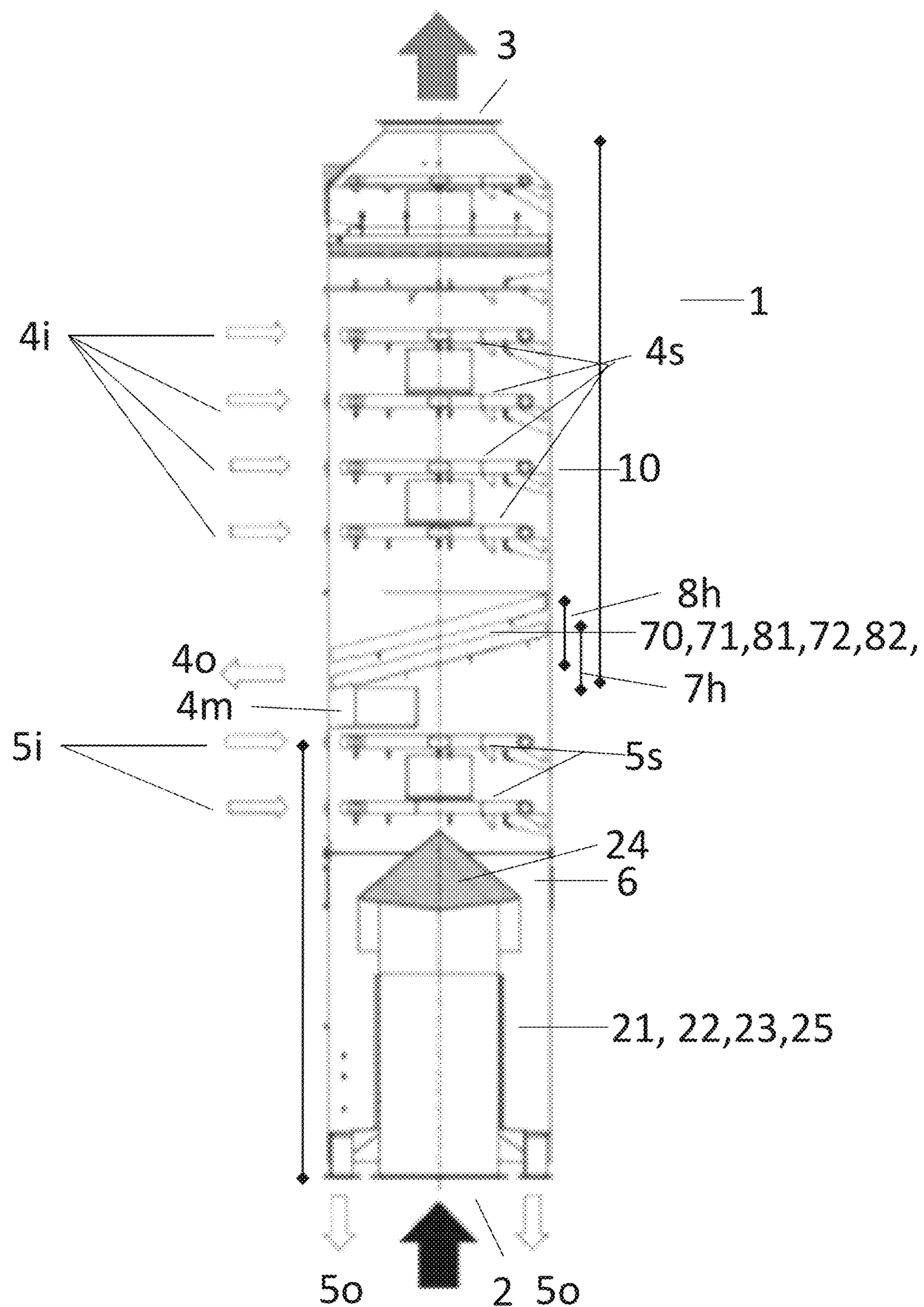
Figure 2:
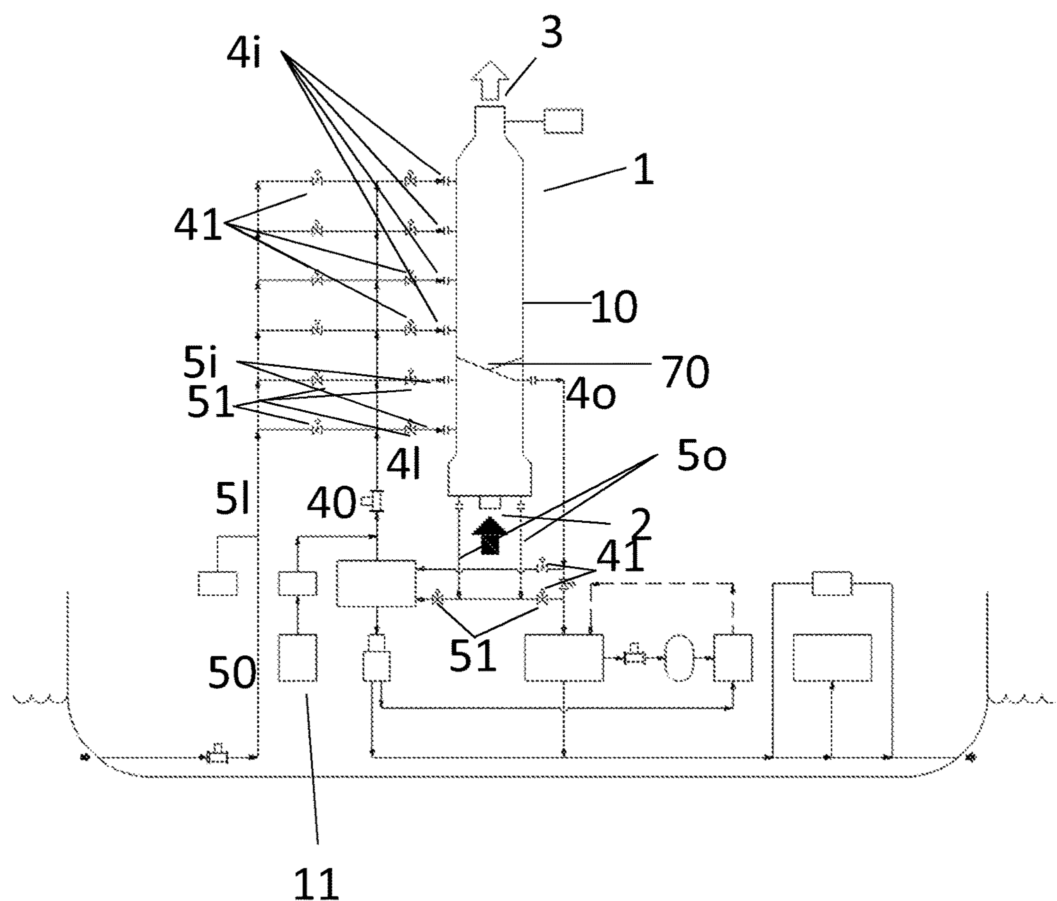
FIG. 2 illustrates a scrubber system with the scrubber (1) and the liquid circuits (44, 50) according to the invention and all of it illustratively placed within a hull.

In an embodiment of the scrubber according to the invention the liquid collector (70) comprising liquid collector means (71,81 . . . ) and gas flow passages (72,82, . . . ) arranged at each appurtenant level (7*h*,8*h*, . . . ) in the extended body (10). The collecting mean (81, . . . ) at one level is horizontally displaced related to the collecting mean (71, . . . ) at the below level and vertically axial overlaying the gas flow passages (72,82, . . . ) of the liquid collector (70) of the below level allowing a vertical upwards flowing gas flow through the scrubber (1) from the inlet (2) to the outlet (3) and thus collecting/retaining the second scrubbing liquid (4*l*) into the second circuit liquid outlets (4*o*) preventing the second scrubbing liquid (4*l*) mixing into the first scrubbing liquid (5*l*). Please see FIG. 1. An advantage of this is that the liquid collector is covering and collection liquid from the full cross section of the scrubber where a scrubbing liquid is supposed to fall and the liquid from the upper section of the scrubber will not mix up with liquid in the lower section and may then be collected separately and treated differently. Arranging collecting means in different layers or levels ensure the possibility of letting the gas flow upwards without the liquid flowing further down than to the lower liquid collecting mean. The collecting means will be arranged aslant with a waterfall towards a liquid outlet (4*o*), preferably towards one side of the extended scrubber body, but other embodiments could be possible as well, such as the highest collecting mean point in the center, as a hat shape, or with the outlet in the center as a funnel etc. The collecting means should be arranged in at least two levels to achieve the above mentioned collecting effect. Embodiments with more levels are possible as far as the collecting means in combination covers the full cross section as discussed above.

In an embodiment of the scrubber according to the invention the liquid collector mean (71,81, . . . ) comprises one or more ducts (7*a*, 7*b*, . . . 8*a*, 8*b*, . . . ) in each level (7*h*, 8*h*, . . . ) parallel arranged with gas flow passages (72,82, . . . ) between the ducts (7*a*, 7*b*, . . . 8*a*, 8*b*, . . . ), and further arranged to cower the full cross section of the extended body (10), please see FIGS. 3 and 4. An advantage of this embodiment is a low reduction in gas speed and low impact of the pressure due to good gas passages and aerodynamic approach of the ducts. In another embodiment the collector means (71, 81) may be formed as perforated plates/sieve plates with holes surrounded by a collar like frame, preventing the liquid flow into the holes when flowing between the holes.

In an embodiment of the scrubber according to the invention the liquid collector means (71, 81, . . . ) are arranged aslant toward the second circuit liquid outlets (4*o*) allowing used the second scrubbing liquid (4*l*) flowing out of the second outlets (4*o*), preferably in one side of the scrubber body (10) and then in an embodiment flow into one or more liquid outlet manifolds (4*m*). This will ensure the liquid flow in the correct direction. Embodiments with the manifold in the center which allows a funnel like collector mean or in the inside circumference of the scrubber body allowing a hat formed collector mean, is also possible.

In an embodiment of the scrubber according to the invention the second scrubbing liquid (4*l*) is connected in fluid communication to a second liquid handling system (40) outside the extended scrubber body (10) and the first scrubbing liquid (5*l*) is connected in fluid communication to a first liquid handling system (50) outside the extended scrubber body (10). Two separate liquid handling systems allows for two separate liquids to be used. Those systems may be operated as open loop, i.e. the scrubbing liquid is taken from the ambient water to the vessel, used in the scrubber for scrubbing the gas and then discharged to the ambient water. Such an open loop may comprise some treatment of the used liquid, such as separation of particles etc. before discharging. The other handling system is the closed loop system. Then the scrubbing liquid, generally ambient water, will be circulated in a closed loop, with a bleed out and addition of make-up water and addition of chemicals as alkali. The closed loop system will have a higher cleaning rate per scrubbing liquid volume but has higher treatments cost due to the need of alkali, cooling steps, tank volumes for processing, storing, sludge discharge, more separation steps for particles among others.

The wet scrubber according to an embodiment of the invention is used with an open water loop and a closed loop but in some situations it may be ran with only closed loops and has also the possibilities to be ran with only open loops. This may be controlled as a function of the surrounding environment and geographically and national environmental restrictions.

To be able to switch between open and closed loops for the scrubber liquids according to an embodiment of the invention, the liquid handling systems (40, 50) are arranged with switch means (41, 51) connected to the inlets (4*i*,5*i*) and the outlets (4*o*,5*o*) and thus arranged for handling scrubbing liquid (4*l*,5*l*) either in a closed loop (40*c*, 50*c*) or in an open loop (40*o*,50*o*). Then one may have the possibility to adapt to surroundings when in restricted areas as harbor, fjords etc, having ability to go to single water system and/or closed loop. One may also close one scrubbing section and run with only the other one in either closed or open loop systems. Major advantages with the dual water system is that one may reduce the amount of alkali use as all extra additives and handling is costly. When using alkali one have to store more liquid onboard when running in areas where discharging to the ambient water is restricted. The dual water system will be more flexible according to local restrictions, and one may optimize costs vs CO2 and Sulphur emission etc. This is even an advantage without the possibility to switch between open and closed loop and only have fixed system with one open and one closed loop system.

In an embodiment of the scrubber according to the invention the second liquid handling system (40) is a closed loop system (40*c*).

In an embodiment of the scrubber according to the invention the first liquid handling system (50) is an open loop system (50*o*).

In an embodiment of the scrubber according to the invention the closed loops (50*c*) and (40*c*) connected to the same closed loop means such as process tanks, alkali feeder etc. This reduces the costs of the equipment, handling and installation and having reduced space demand.

In an embodiment of the scrubber according to the invention the scrubber comprises a water trap (6) with an outlet (21) arranged between the gas inlet (2) and the one or more spry means (5*s*) wherein the water trap (6) is arranged to prevent liquid flowing into the gas inlet (2). In an embodiment of the invention the water trap (6) comprises a lower compartment (25) with the gas inlet (2) in the bottom and with at least one vertical directed cylindrical pipe socket (22) at the gas inlet (2) with radial directed perforations (23) and an overlying hat (24) and the vertical directed cylindrical pipe socket (22) has double walls with perforations (23).

The invention is also an inline scrubbing method for cleaning a flue gas (0) onboard a vessel wherein the flue gas (0) will flow through an inlet (2), upwards through a vertical extended body (10) and out through an outlet (3). The first scrubbing liquid (5*l*) is lead through one or more first circuit liquid inlets (5*i*) and into the gas (0) through one or more first scrubbing liquid spray means (5*s*) in a first scrubbing section (5) in a lower section of the extended body (10) for cleaning the gas by so called scrubbing. The gas (0), will then flow through one or more liquid collectors (70) arranged in the cross section of the extended body (10) into the spray of the second scrubbing liquid (4*l*) that is lead through one or more second circuit liquid inlets (4*i*) and into the gas (0) through one or more second scrubbing liquid spray means (4*s*) in a second scrubbing section (4) in upper section of the extended body (10). The liquid (4*l*) after being in contact with the flue gas will then be collected in one or more liquid collectors (70). The collected liquid (4*l*) is then lead into the second circuit liquid outlets (4*o*) in the lower part of the second scrubbing section (4) of the extended body (10). The scrubbing liquid (4*l*) is in this way prevented from mixing into the first scrubbing liquid (5*l*) but the cleaned gas (0) further flows upwards towards the outlet (3). In an embodiment according to the invention the scrubber liquid (4*l*, 5*l*) is taken from outside a hull of the vessel to supply the circuit liquid inlets (4*ia*, 4*ib*, . . . 5*ia*, 5*ib*,).

Considered the surrounding environment one may decide to switch between open and closed loop in one or more of the liquid circuits thus on a given signal one may operate one or more switch means (41, 51) connected to one or more of the inlet (4*i*, 5*i*) and one or more of the outlet (4*o*, 5*o*) to a closed loop or an open loop position letting the first and/or second scrubbing liquid flow in a closed loop or an open loop system (40, 50).

In an embodiment switch means may be valve means and also be used for regulating possible added make up water or bleed out of used scrubber liquid.

An advantageous embodiment of the inline dual water scrubbing method is to let the first scrubbing liquid (5*l*) flow in an open loop system (50) and the second scrubbing liquid (4*l*) flowing in an closed loop system (40) and adding alkali and make-up water to the closed loop and thereby adjust the degree of cleaning the gas.

This having the advantages that one may run the scrubber with only one scrubbing section running and this might be either as open or closed loop. For instance in restricted harbor areas etc. one may still run the scrubber on low water consumption and bleed off the liquid into a storage tank. If the vessel are running in open, no or little restricted areas when it comes to emission and discharge from scrubbers, one may for instance run the whole scrubber in open loop. Addition of chemicals may also be controlled upon desire.

In an embodiment of the invention the wet scrubber according to the invention comprise a water trap arranged between the gas inlet (2) and the very first scrubbing spray means and with an outlet (21) in a way that the water trap is arranged to prevent dropping liquid into the gas inlet (2). This is substantially for the liquid not to be lead into the engine.

The water trap (6) comprises in an embodiment of the invention a lower compartment (25) with the gas inlet (2) in the bottom and with a vertical directed cylindrical pipe socket (22) at the gas inlet (2) with radial directed perforations (23) and an overlying hat (24). Here the gas is lead horizontally out through the perforations and further up through the scrubber. Such a water trap has several advantages. The production costs are low, it is light weighted and for the process it has an advantageous low pressure drop. In an embodiment of the invention the cylindrical perforated pipe socket has double walls to secure that water drops do not splash back against the gas flow.

After being cleaned by the scrubbing liquids the gas may contain some water and in an embodiment of the invention the gas may further be lead to a separate droplet separator from the outlet to remove further water from the wet gas.

An advantage of the dual water system is that one may reduce the liquid spray to reach the desired degree of gas cleaning when having one scrubbing section running in closed loop with added chemicals. This will reduce the pressure drop through the scrubber and the scrubber may thus be installed and work without, or with lower need, for additional fan to accelerate the gas. This contributes to a less space demanding system as well.

A substantial advantage of the invention is that it effectively purifies the gas from the motor, driven by diesel or heavy oil, in order to meet the official requirements for emission to air and water. Those requirements may be met by the use of higher refined product qualities as fuel to, for instance, the motors onboard a marine vessel, but refining of oil brings along another pollution problem, as $CO2$ emission, during this process. Producing lighter fuel products such as diesel and LNG are 20-30% more energy demanding. By using heavier combustion fuels and installing an effective scrubber as defined by this invention the total environmental accounts will be more positive than by using lighter combustion fuels.

The system provides the benefit of utilization of advantageous scrubbing effect of the available ambient, generally sea water used in one, and generally the first scrubbing section, and the recirculating water, which may be fresh water, ambient sea water etc., in the second scrubbing section, to complete needed exhaust gas cleaning in a slender scrubber body. Thus the required cleaning of the gas in order to meet the exhaust gas emissions requirements may be fulfilled in optimized manner.

The invention claimed is:

1. A marine vessel exhaust in-line dual water scrubber, comprising:

a vertically extending body;

an exhaust gas inlet from a diesel or oil driven motor in said marine vessel; and a cleaned gas atmospheric outlet, wherein said exhaust gas inlet is underlying in a lower section of said vertically extending body and said cleaned gas outlet is overlying in an upper section of said vertically extending body, wherein said exhaust gas inlet comprises a water trap with an outlet arranged between said exhaust gas inlet and one or more first scrubbing liquid sprayers, wherein said water trap is arranged to prevent liquid flowing into said exhaust gas inlet;

said scrubber further comprising:

a first underlying scrubbing section comprising:

one or more first circuit liquid inlet;

said one or more first scrubbing liquid sprayers; and one or more first circuit liquid outlets, for a first scrubbing liquid, a second scrubbing section in said upper section of said vertically extending body, comprising:

one or more second circuit liquid inlets;

one or more second scrubbing liquid sprayers; and one or more second circuit liquid outlets, for a second scrubbing liquid, wherein said first scrubbing liquid is connected to a first scrubbing liquid handling system and said second scrubbing liquid is connected to a second scrubbing liquid handling system, said first and second liquid handling systems being outside said vertically extending scrubber body, wherein said second liquid handling system has a chemical adding equipment, wherein said first and second liquid handling systems are arranged with first switches connected to said first circuit liquid inlets and said first circuit liquid outlets, and second switches connected to said second circuit liquid inlets and said second circuit liquid outlets, and are arranged for separate handling of said first and second scrubbing liquids either both in closed loops, or in a closed loop and in an open loop wherein said first scrubbing liquid is sea water taken from the sea, used in the scrubber for scrubbing the gas and then discharged to the sea, or both in open loops wherein said first and said second scrubbing liquid is sea water taken from the sea, used in the scrubber for scrubbing the gas and then discharged to the sea;

wherein one or more liquid collectors are arranged above said one or more first scrubbing liquid sprayers, wherein said one or more liquid collectors are arranged in fluid connection with said second circuit liquid outlets for collecting one or more said one or more second scrubbing liquid for preventing said second scrubbing liquid from mixing up with said first scrubbing liquid in order to treat said first and second scrubbing liquids differently outside the vertically extending scrubber body, and for flow through of a vertically upwards flowing exhaust gas-flow from said exhaust gas inlet to said cleaned gas outlet, said one or more liquid collectors comprising liquid collector means and exhaust gas flow passages arranged at each appurtenant level in said vertically extending body, wherein said liquid collector means at a level is horizontally displaced relative to the first liquid collector means at a below level, overlaying said exhaust gas flow passages of the liquid collector means of the below level, wherein said liquid collector means comprises one or more ducts in each level arranged in parallel with gas flow passages between said ducts, and is further arranged to cover a full cross section of said vertically extending body allowing a vertically upwards flowing gas flow through said scrubber from said exhaust gas inlet to said cleaned gas outlet and collecting/retaining said second scrubbing liquid into said second circuit liquid outlets, preventing said second scrubbing liquid mixing into said first scrubbing liquid.

2. The scrubber according to claim 1, wherein said closed loop systems are respectively switchable connected to at least one of a process tank and an alkali feeder.

3. The scrubber according to claim 1, wherein in a switchable state both the first and second scrubbing liquids comprise the same water type.

4. The scrubber according to claim 1, wherein the first and second liquid collector means are arranged aslant toward said second circuit liquid outlets allowing used said second scrubbing liquid flowing out of said second circuit liquid outlets.

5. The scrubber according to claim 2, wherein the first and second liquid collector means are arranged aslant toward said second circuit liquid outlets allowing used said second scrubbing liquid flowing out of said second circuit liquid outlets.

6. The scrubber according to claim 1, wherein said one or more liquid collector and said one or more second circuit liquid outlets are connected with a liquid outlet manifold.

7. The scrubber according to claim 2, wherein said one or more liquid collector and said one or more second scrubbing liquid outlets are connected with a liquid outlet manifold.

8. The scrubber according to claim 4, wherein said one or more liquid collector and said one or more second scrubbing liquid outlets are connected with a liquid outlet manifold.

9. The scrubber according to claim 1, wherein said first and second scrubbing liquid handling systems are switchable arranged to form a respective closed loop system.

10. The scrubber according to claim 1, wherein said first scrubbing liquid handling system is switchable arranged to form an open loop system.

11. An inline scrubbing method of using the marine vessel exhaust in-line water scrubber according to claim 1, comprising the steps of:

letting said exhaust gas flow through the exhaust gas inlet, upwards through said vertically extending body and out through the cleaned gas atmospheric outlet, wherein said exhaust gas flows through said inlet via the water trap;

leading a first scrubbing liquid through the one or more first circuit liquid inlets and into said exhaust gas through the one or more first scrubbing liquid sprayers in the first scrubbing section in the lower section of said vertically extending body;

letting said exhaust gas, after being scrubbed by said first scrubbing liquid, flow through one or more liquid collectors arranged in the cross section of said vertically extending body; then leading a second scrubbing liquid through said one or more second circuit liquid inlets and into said exhaust gas through the one or more second scrubbing liquid sprayers in the second scrubbing section in the upper section of said vertically extending body;

controlling the degree of purification by adding a chemical to the first or second scrubbing liquids;

collecting said second scrubbing liquid, after being in contact with said exhaust gas in said one or more liquid collectors and lead into said second circuit liquid outlets in said lower part of said second scrubbing section of said vertically extending body, preventing said second scrubbing liquid mixing into said first scrubbing liquid, said first scrubbing liquid flow in the open loop system and said second scrubbing liquid flowing in a closed loop system;

letting said gas further flow upwards towards the cleaned gas atmospheric outlet;

supplying said first scrubber liquid to said first circuit liquid inlets, or said second scrubber liquid to said second circuit liquid inlets, or both said first and second scrubber liquids to said first and second circuit liquid inlets, respectively, from outside a hull of said vessel; and as a function of a surrounding environment and geographically and national environmental restrictions, operating one or more of said first and second switches connected to one or more of said first and second inlets and one or more of said first and second outlets to a closed loop or an open loop position for separately letting said first and second scrubbing liquid flow in a closed loop or an open loop system for optimizing said scrubber to emission requirements.

12. The inline scrubbing method according to claim 11, further comprising closing off one of said scrubbing sections running the other scrubbing section in either closed or open loop.

* * * * *